US010073735B1

(12) United States Patent
Cai et al.

(10) Patent No.: US 10,073,735 B1
(45) Date of Patent: Sep. 11, 2018

(54) SEEDING MECHANISM FOR ERROR DETECTION CODES

(71) Applicant: Seagate Technology LLC, Cupertino, CA (US)

(72) Inventors: Jun Cai, Singapore (SG); Jeetandra Kella, Singapore (SG); ChuanPeng Ong, Singapore (SG); Brian T Edgar, Minneapolis, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 83 days.

(21) Appl. No.: 14/526,184

(22) Filed: Oct. 28, 2014

(51) Int. Cl.
*G11C 29/00* (2006.01)
*G06F 11/10* (2006.01)

(52) U.S. Cl.
CPC ............... *G06F 11/1076* (2013.01)

(58) Field of Classification Search
CPC .... G06F 9/441; G06F 11/004; G06F 11/1479; G06F 11/201; G06F 11/2092
See application file for complete search history.

(56) References Cited

U.S. PATENT DOCUMENTS

| | | | |
|---|---|---|---|
| 5,268,866 A | 12/1993 | Feng et al. | |
| 5,588,012 A * | 12/1996 | Oizumi | G06F 3/0601 714/781 |
| 5,764,659 A | 6/1998 | Tanio | |
| 6,023,387 A * | 2/2000 | Stenfort | G11B 20/18 360/48 |
| 6,041,429 A * | 3/2000 | Koenemann | G01R 31/31813 714/726 |
| 6,219,656 B1 | 4/2001 | Cain et al. | |
| 6,385,578 B1 * | 5/2002 | Lee | G10L 19/012 381/94.1 |
| 6,446,868 B1 * | 9/2002 | Robertson | G06K 7/14 235/462.1 |
| 6,467,060 B1 | 10/2002 | Malakapalli et al. | |
| 7,350,135 B2 | 3/2008 | Kim | |
| 7,472,332 B2 | 12/2008 | Allen et al. | |
| 8,205,137 B2 | 6/2012 | Allen et al. | |
| 8,397,101 B2 | 3/2013 | Goss et al. | |

(Continued)

OTHER PUBLICATIONS

Suresh et al., "Shingled Magnetic Recording for Big Data Applications", Carnegie Mellon University, Parallel Data Laboratory, CMU-PDL-12-105, May 2012, 29 pages.*

*Primary Examiner* — Guy Lamarre
(74) *Attorney, Agent, or Firm* — Cesari & Reed, LLP; Kirk A. Cesari; Logan Brown

(57) ABSTRACT

Systems and methods are disclosed for a seeding mechanism for error detection codes. An error detection code may be generated using specifically modified seed input and stored to data sectors not containing valid data. A data storage device may determine if read attempts are directed to an invalid sector by analysis of the stored error detection code. In some embodiments, an apparatus may determine a first error detection code stored to a target data storage sector does not match a second error detection code calculated for the target data storage sector, compare the first error detection code to a modified error code value to determine whether the target data storage sector contains valid data, and return an indication that the target data storage sector does not contain valid data when the error detection code matches the modified error code value.

19 Claims, 11 Drawing Sheets

(56) References Cited

U.S. PATENT DOCUMENTS

| | | | |
|---|---|---|---|
| 8,514,711 B2* | 8/2013 | Lee | H04N 21/2662 370/235 |
| 8,988,800 B1* | 3/2015 | Varnica | G11B 20/1833 360/31 |
| 2001/0027540 A1* | 10/2001 | Cho | G06F 1/035 714/37 |
| 2004/0123013 A1* | 6/2004 | Clayton | G06F 11/1004 710/310 |
| 2005/0165980 A1* | 7/2005 | Clayton | G06F 11/1004 710/22 |
| 2008/0022041 A1* | 1/2008 | Nakajima | G06F 11/004 711/114 |
| 2008/0040598 A1* | 2/2008 | Lee | G06F 9/441 713/2 |
| 2013/0227379 A1 | 8/2013 | Gupta et al. | |
| 2013/0326117 A1* | 12/2013 | Aune | G06F 3/0608 711/103 |
| 2014/0068208 A1 | 3/2014 | Feldman | |
| 2014/0101490 A1* | 4/2014 | Cronin | G06F 11/1004 714/42 |
| 2014/0245093 A1* | 8/2014 | Ma | G06F 11/08 714/747 |
| 2016/0283323 A1* | 9/2016 | Yeung | G06F 11/1016 |

* cited by examiner

600

| LBA of sector | LBA' = One's complement of LBA |
|---|---|
| 1111 1111 = 255 | 0000 0000 = 0 |
| 1111 1110 = 254 | 0000 0001 = 1 |
| 0110 0111 = 103 | 1001 1000 = 154 |
| 0000 0000 = 0 | 1111 1111 = 255 |

SEEDING MECHANISM FOR ERROR DETECTION CODES

SUMMARY

In certain embodiments, an apparatus may comprise a processor configured to determine a first error detection code stored to a target data storage sector does not match a second error detection code calculated for the target data storage sector, compare the first error detection code to a modified error code value to determine whether the target data storage sector contains valid data, and return an indication that the target data storage sector does not contain valid data when the error detection code matches the modified error code value.

In certain embodiments, a method may comprise receiving a request to read a target memory location of a data storage device, comparing a first error detection code (EDC) stored to the target memory location to a modified EDC to determine whether the target memory location contains valid data, and returning an indication that the target memory location does not contain valid data when the first EDC matches the modified EDC.

In certain embodiments, a memory device may store instructions that, when executed, cause a processor to perform a method comprising receiving a request to read a target memory location of a data storage device, comparing a first error detection code (EDC) stored to the target memory location to a modified EDC to determine whether the target memory location contains valid data, and returning an indication that the target memory location does not contain valid data when the first EDC matches the modified EDC.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Further, the methods described herein may be implemented as a computer readable storage medium or memory device including instructions that when executed cause a processor to perform the methods.

Figure 1:
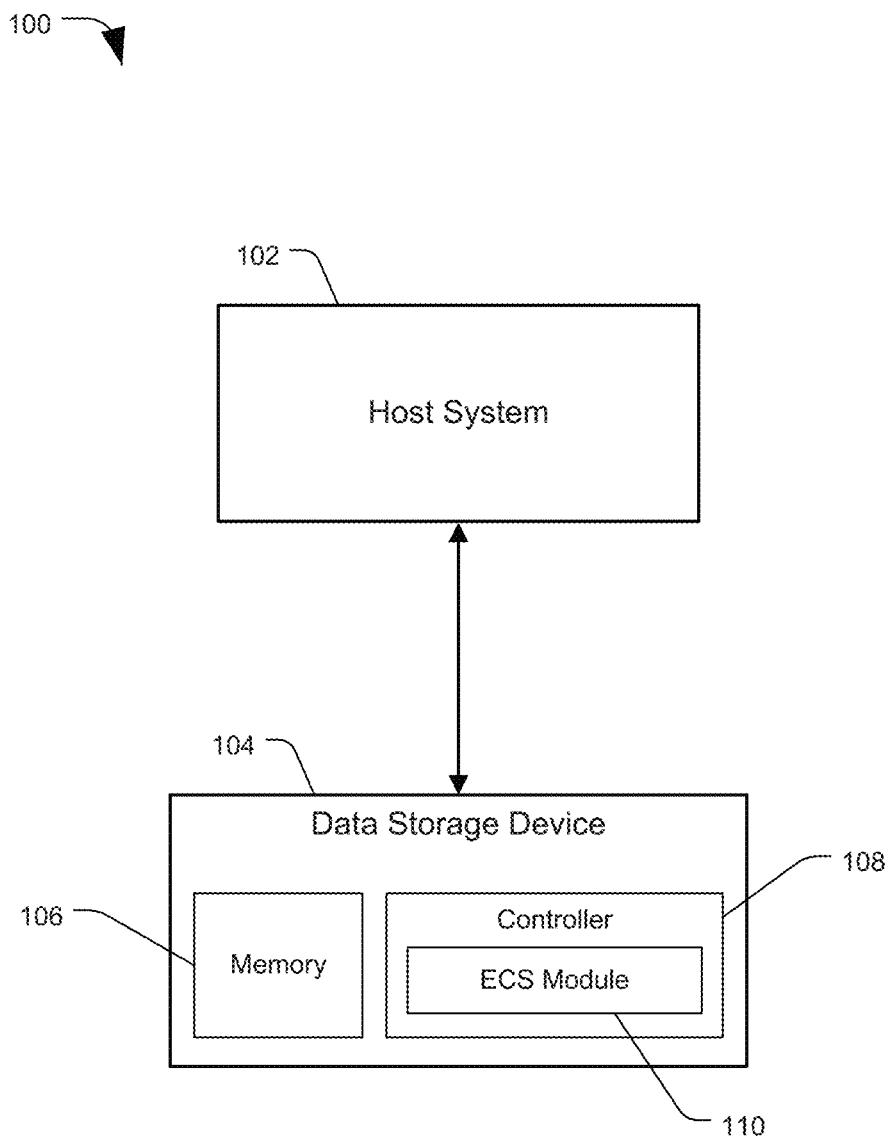
FIG. 1 is a diagram of a system employing a seeding mechanism for error detection codes, in accordance with certain embodiments of the present disclosure.

FIG. 1 is a diagram of a system employing a seeding mechanism for error detection codes, generally designated 100, in accordance with certain embodiments of the present disclosure. The system 100 may include a host 102 and a data storage device (DSD) 104. The host 102 may also be referred to as the host system or host computer. The host 102 can be a desktop computer, a laptop computer, a server, a tablet computer, a telephone, a music player, another electronic device, or any combination thereof. Similarly, the DSD 104 may be any of the above-listed devices, or any other device which may be used to store or retrieve data. The host 102 and DSD 104 may be connected by way of a wired or wireless connection, or by a local area network (LAN) or wide area network (WAN). In some embodiments, the DSD 104 can be a stand-alone device not connected to a host 102 (e.g. a removable data storage device having its own case or housing), or the host 102 and DSD 104 may both be part of a single unit (e.g. a computer having an internal hard drive).

The DSD 104 may include a memory 106 and a controller 108. The memory 106 may comprise magnetic storage media such as disc drives, nonvolatile solid state memories such as Flash memory, other types of memory, or a combination thereof. The controller 108 may comprise a circuit or processor configured to control operations of the data storage device 104, such as storing data to or retrieving data from the memory 106. The DSD 104 may receive a data read or write request from the host device 102, and use the controller 108 to perform data operations on the memory 106 based on the request.

Data may be stored to memory 106, for example in units of sectors. At times, firmware or software bugs or other errors may result in attempting to read sectors that do not contain valid data, which may result in returning bad data to a host 102. Valid data is a most recent version of data that has not been marked for deletion. In some events, mapping information for valid data may be lost, for example due to an unexpected power. Systems and methods for determining which sectors contain valid data may be desirable to prevent reading of bad data, or to reconstruct mapping information.

Error detection codes may be included with data sectors, which can be used by a DSD 104 to detect and correct errors that may arise during reading or writing data. In some embodiments, error detection codes may be used to determine whether a sector contains valid data.

Accordingly, DSD 104 may include an error code seeding (ECS) module 110. The ECS module 110 may be a processor, controller, or other circuit, or it may be a set of software instructions that, when executed by a processing device, perform the functions of the ECS module 110. In some embodiments, the ECS module 110 may be part of or executed by controller 108. The ECS module 110 may control the seeding and generation of error detection codes for recording to a data storage medium. For example, the ECS module 110 may perform calculations or functions to generate a cyclic redundancy check (CRC) checksum, such as an input output error detection code (IOEDC), to record to sectors of a data storage medium. The ECS module 110 may generate codes using a first function for sectors containing valid data, and may generate codes using a second function for sectors containing invalid data. In some embodiments, ECS module 110 may also determine whether an error detection code read from a storage medium indicates that the data of the sector is valid data or invalid data, based on whether the error detection code was generated with a first function or a second function.

Figure 2:
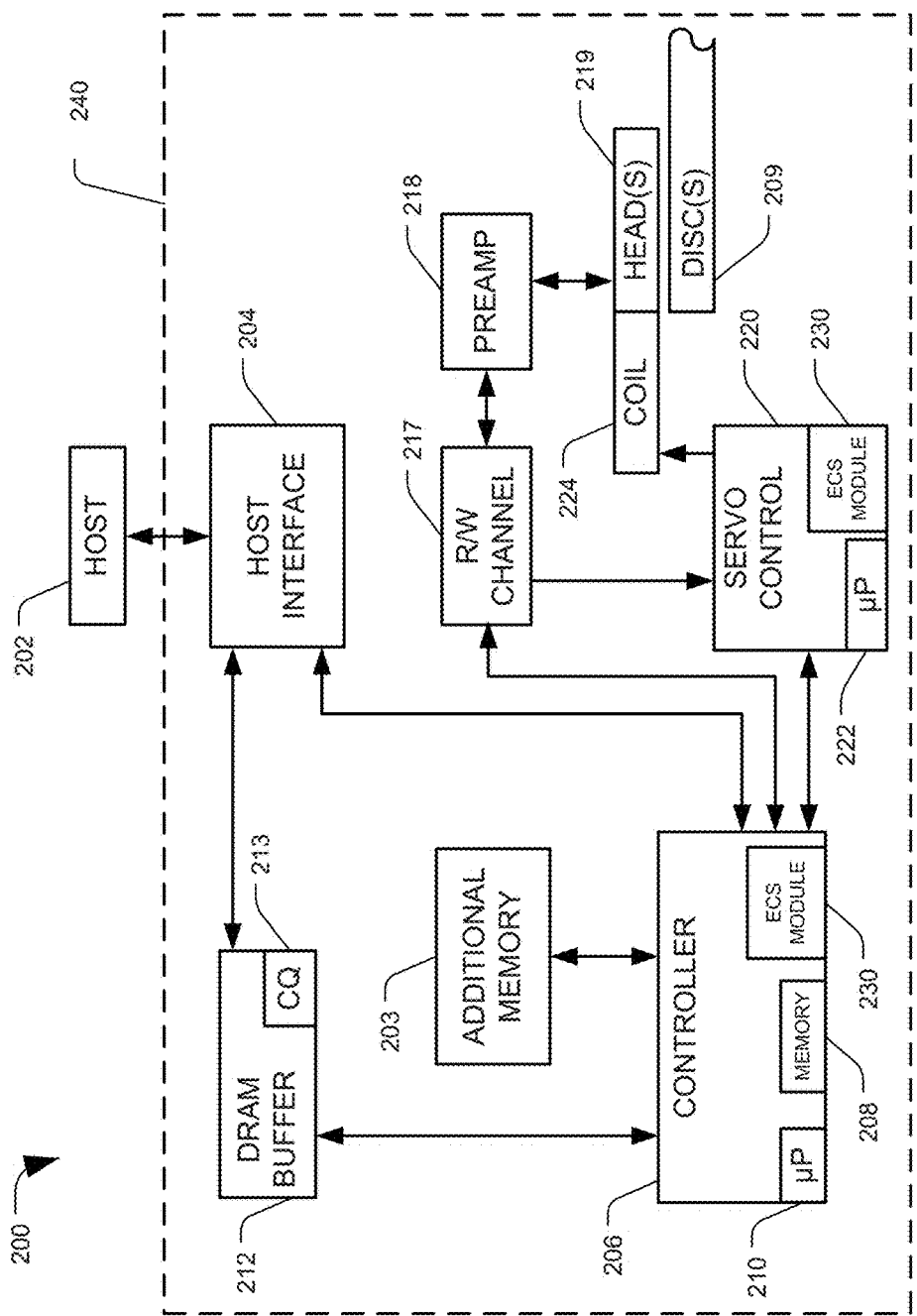
FIG. 2 is a diagram of a system employing a seeding mechanism for error detection codes, in accordance with certain embodiments of the present disclosure.

FIG. 2 is a diagram of a system employing a seeding mechanism for error detection codes, generally designated 200, in accordance with certain embodiments of the present disclosure. Specifically, FIG. 2 provides a functional block diagram of an example data storage device (DSD) 200. The DSD 200 may be a data storage device such as the device 104 shown in FIG. 1. The DSD 200 can communicate with a host device 202 (such as the host system 102 shown in FIG. 1) via a hardware or firmware-based interface circuit 204. The interface 204 may comprise any interface that allows communication between a host 202 and a DSD 200, either wired or wireless, such as USB, IEEE 1394, Compact Flash, SATA, eSATA, PATA, SCSI, SAS, PCIe, Fibre Channel, Ethernet, or Thunderbolt, among others. The interface 204 may include a connector (not shown) that allows the DSD 200 to be physically removed from the host 202. In some embodiments, the DSD 200 may have a casing 240 housing the components of the DSD 200, or the components of the DSD 200 may be attached to the housing, or a combination thereof. The DSD 200 may communicate with the host 202 through the interface 204 over wired or wireless communication.

The buffer 212 can temporarily store data during read and write operations, and can include a command queue (CQ) 213 where multiple pending operations can be temporarily stored pending execution. Commands arriving over the interface 204 may automatically be received in the CQ 213 or may be stored there by controller 206, interface 204, or another component.

The DSD 200 can include a programmable controller 206, which can include associated memory 208 and processor 210. In some embodiments, the DSD 200 can include a read-write (R/W) channel 217, which can encode data during write operations and reconstruct user data retrieved from a memory, such as disc(s) 209, during read operations. A preamplifier circuit (preamp) 218 can apply write currents to the head(s) 219 and provides pre-amplification of readback signals. A servo control circuit 220 may use servo data to provide the appropriate current to the coil 224, sometimes called a voice coil motor (VCM), to position the head(s) 219 over a desired area of the disc(s) 209. The controller 206 can communicate with a processor 222 to move the head(s) 219 to the desired locations on the disc(s) 209 during execution of various pending commands in the command queue 213.

In some embodiments, the DSD 200 may include solid state memory instead of or in addition to disc memory. For example, the DSD 200 can include an additional memory 203, which can be either volatile memory such as DRAM or SRAM, or non-volatile memory, such as NAND Flash memory. The additional memory 203 can function as a cache and store recently or frequently read or written data, or data likely to be read soon. Additional memory 203 may also function as main storage instead of or in addition to disc(s) 209. A DSD 200 containing multiple types of nonvolatile storage mediums, such as a disc(s) 209 and Flash 203, may be referred to as a hybrid storage device.

DSD 200 may include an error code seeding (ECS) module 230. The ECS module 230 may be a processor, controller, or other circuit, or it may be a set of software instructions that, when executed by a processing device, perform the functions of the ECS module 230. In some embodiments, the ECS module 230 may be part of or executed by controller 206, or part of or executed by servo control circuit 220. In some embodiments, the ECS module 230 may be included elsewhere in the DSD 200, such as in the R/W channel 217, or as a standalone component not included in another component. The ECS module 230 may control the seeding and generation of error detection codes for recording to a data storage medium, such as disc 209. For example, the ECS module 230 may generate error detection codes using a first function for sectors containing valid data, and may generate codes using a second function for sectors containing invalid data. In some embodiments, generating different error detection codes for sectors not containing valid data may have additional utility when applied in a system employing sequential data writing, such as for shingled magnetic recording (SMR).

Figure 3A:
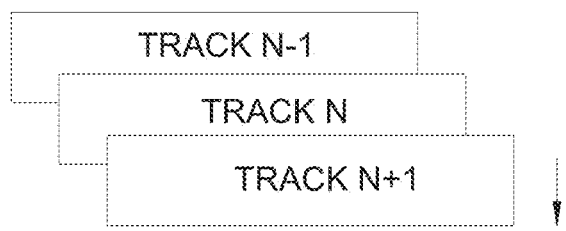
FIGS. 3A and 3B are diagrams of a system employing a seeding mechanism for error detection codes, in accordance with certain embodiments of the present disclosure.
Figure 3B:
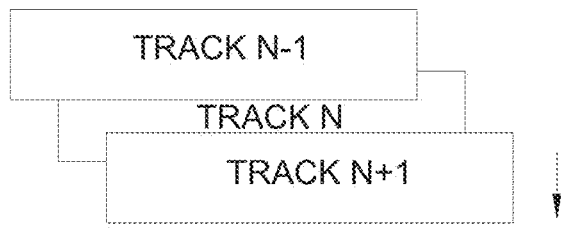

FIGS. 3A and 3B are diagrams of examples of a system employing a seeding mechanism for error detection codes, in accordance with certain embodiments of the present disclosure. FIGS. 3A and 3B depict data recording tracks arranged in a shingled manner according to certain embodiments of the present disclosure. In some embodiments, such as with shingled magnetic recording (SMR), each track may partially overlap an adjacent track, and data may only be written in a specified direction (e.g. first track N−1, then track N, then track N+1, etc.). The shingle write direction may be referred to as the "positive" direction, while the opposite writing direction may be referred to as the "negative" direction. It should be understood that the positive direction may be from the inner diameter (ID) to the outer diameter (OD) of the recording medium, or vice versa. The positive direction may even be different per zone or per shingled recording band, for example based on a write head's writing capabilities in different directions at different points over a recording medium.

Referring to FIG. 3A, if it is assumed that writing is performed in the arrow-indicated positive direction in the shingle-write scheme, when writing to track N, adjacent track N−1 may be partially overwritten. Similarly, when writing is performed on track N+1, adjacent track N may be partially overwritten. In contrast to recording methods where each track is written without any intentional overlap, SMR may result in increased recording density due to a higher tracks per inch (TPI) characteristic in a radial direction of a storage medium.

As illustrated in FIG. 3B, after writing on track N, if track N−1 is written in the negative direction of the positive shingled recording direction, track N may become unreadable due to Adjacent Track Interference (ATI), or being partially overwritten by both adjacent tracks (i.e. track N−1 and track N+1). Therefore, it may be advantageous to follow a constraint that track N−1 should not be written after track N is written. Accordingly, writing or modifying data on track N−1 after track N is recorded, or on track N after track N+1 is recorded, may require a different writing strategy than with non-shingled tracks, which can simply be overwritten at any time. In some embodiments, data may be written to each track in a set of shingled tracks in a sequential order having a first writing direction.

Figure 4:
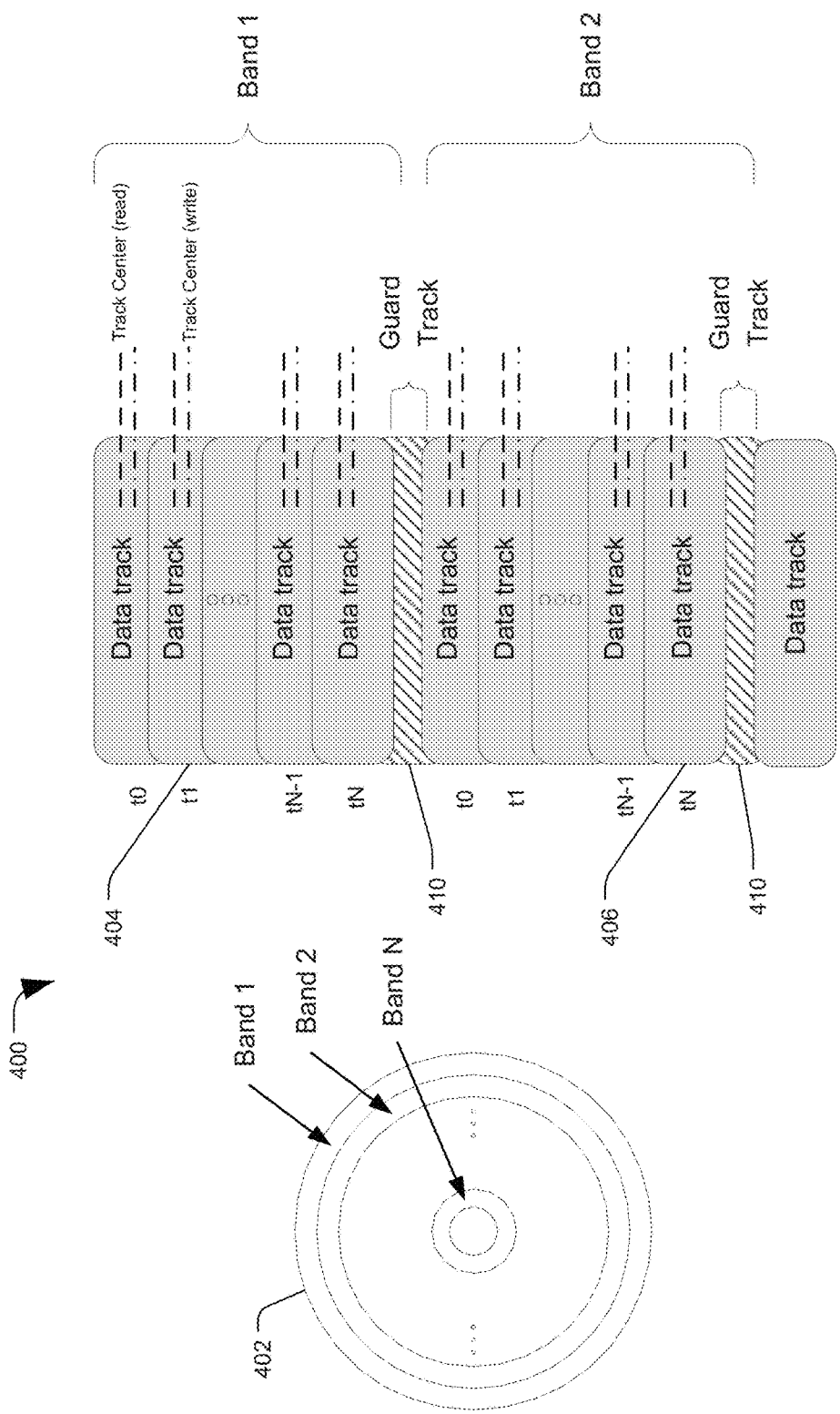
FIG. 4 is a diagram of a system employing a seeding mechanism for error detection codes, in accordance with certain embodiments of the present disclosure.

FIG. 4 is a diagram of a system employing a seeding mechanism for error detection codes, generally designated 400, in accordance with certain embodiments of the present disclosure. Due to the track write overlap of SMR, writing a given track N−1 after track N has been written may require rewriting all shingled tracks that following track N−1 (i.e. track N, track N+1, track N+2, etc.). In order to accomplish this realistically, a set of shingled tracks may be grouped into a "band," such that writing the last track of a given band of tracks X does not require rewriting any of the following tracks in bands X+1, X+2, X+3 and so on. Rotating disc media 402 may be divided into a plurality of bands (e.g. Band 1, Band 2, etc.), and each band of tracks may contain a plurality of shingled data tracks, in which at least one data track partially overlaps another data track in a shingled manner.

Separating bands so that rewriting one does not require rewriting tracks outside the band can be accomplished by locating the tracks such that the last track of a band is not trimmed or overlapped by a track that can be written. Bands may have a number of shingled tracks 404, such as tracks t0 through tN−1 of FIG. 4, which are partially overlapped by adjacent tracks. Bands may end with an unshingled "fat" track 406, such as track tN of FIG. 4, which does not have a reduced read track pitch relative to its write track pitch because it is not partially overlapped by a track that can be written to. Because the last track 406 is not overlapped by a writable track, the band can be rewritten without affecting tracks outside the band. The last track 406 of each band may be followed by a "not-to-be-written" track 410, preventing the last track 406 from being partially overwritten. Not-to-be-written tracks may be referred to as "guard tracks" 410, as they provide band boundaries to separate writable tracks of different bands and guard the last track 406 of a band from being trimmed by or trimming tracks outside the band. When track t0 needs to be re-written, tracks t0 to the fat track tN 406 can be rewritten, while tracks in other bands are not affected. In some embodiments, a single guard track 410 may be used, while in some embodiments multiple tracks may be designated as "not to be written" between bands to provide a larger buffer against ATI. A guard track 410 may also be referred to as a guard band or isolation track.

Writing to a shingled band may include writing a first track, then writing a next adjacent track, and so on until writing the "fat" track at the end of the band opposite to the first track. If data within the band is to be updated or changed, a read-modify-write (RMW) operation, sometimes call a banded rewrite operation (BRO) may be performed. A BRO may include reading the data from the band into a RAM memory or some other "workspace" memory, modifying the read data with the new data to be written, and then writing the modified data back to the original band or to another band. For example, if new data is to be written to track six of a fifty-track band, the entire band may be read, the data for track six may be modified, and the modified band data may be re-written. A partial BRO may include reading a modifying a portion of a band, while maintaining the shingled write order. For example, if new data is to be written to track twenty of a fifty-track band, a partial BRO may include reading tracks twenty through fifty, modifying the data for track twenty, and rewriting tracks twenty through fifty. The data of tracks one through nineteen may not need to be modified.

In some embodiments when an area of a storage medium has been cleared or wiped, such as based on a FORMAT, TRIM, or similar command, the sectors may be recorded with a default data pattern, such as all 0's. In some embodiments, sectors may be designated as erased or available for writing, but may still contain invalid old data. Attempts to read data from invalid sectors may result in returning bad data or nonsense data. Further, when a track in a shingled band is written, the next track potentially gets weak-writes or is partially overwritten and may become unreadable. Even if the device succeeds in reading the data, it may be outdated or otherwise invalid. In some embodiments, bad or invalid data may be read and returned in response to a read command.

Accordingly, data reads may preferably be restricted to sectors or memory locations that have been written with valid data. If a data read is directed to a sector or memory location that does not contain valid data, the DSD may fabricate a default pattern in an internal buffer and transfer the default pattern to the host, rather than returning bad or invalid data. However, avoiding reads to invalid sectors may be difficult, in some embodiments. Similarly, attempting to determine the location of validly written sectors or a last sequential validly-written location after an unexpected power loss or similar event can also be difficult. For example, since shingled recording involves sequential writes in some embodiments, the last valid memory location may be determined for recovery from unexpected power loss by determining the first sector that contains invalid data, or a first readable sector (e.g. not overwritten due to shingling).

Figure 5:
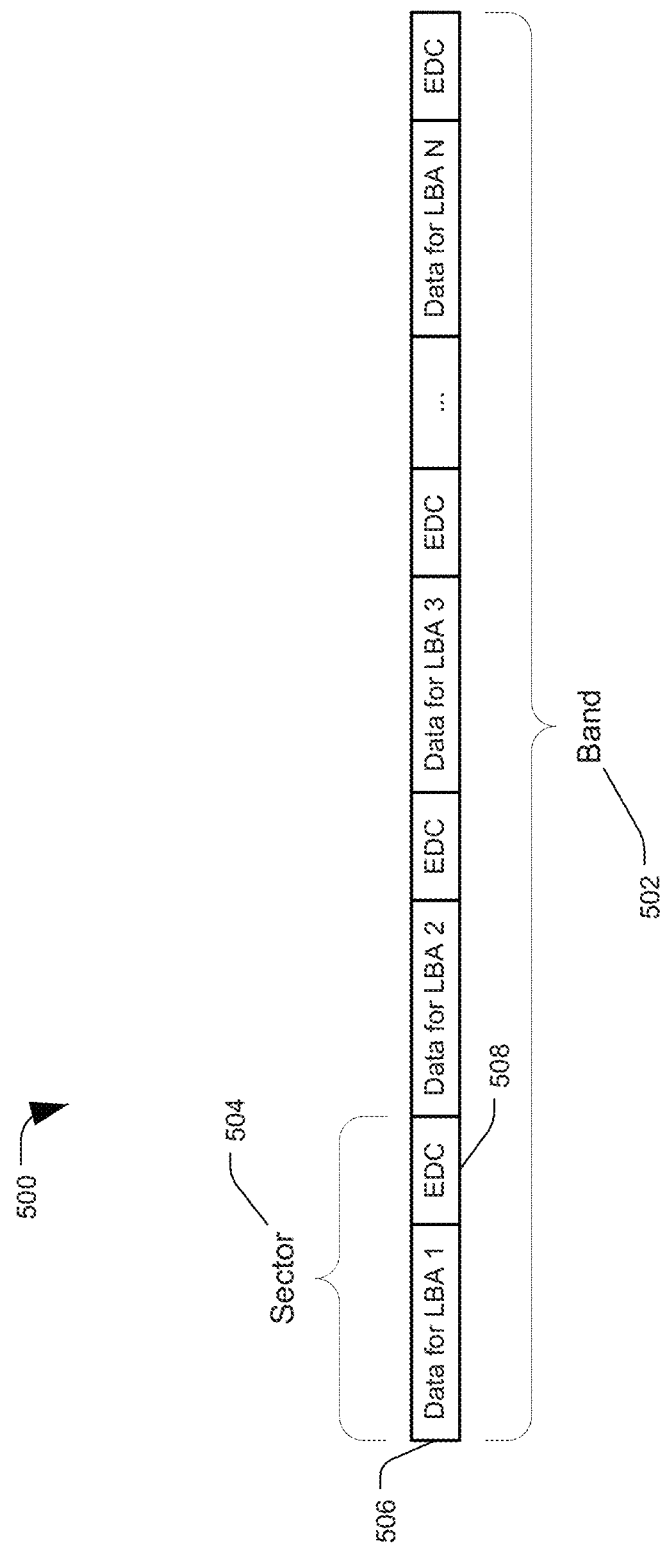
FIG. 5 is a diagram of a system employing a seeding mechanism for error detection codes, in accordance with certain embodiments of the present disclosure.

FIG. 5 is a diagram of a system employing a seeding mechanism for error detection codes, generally designated 500, in accordance with certain embodiments of the present disclosure. FIG. 5 may depict sectors 504 of a shingled recording band 502. Band 502 may contain a selected number of tracks, each track having a number of sectors for storing data. Accordingly, band 502 may include N sectors designated for storing data associated with logical block addresses (LBAs) 1−N. LBAs may be host-selected addresses for tracking the location of blocks of data (e.g. 512 byte data blocks) using the host's file system. A host may send data to a data storage device (DSD) for storage, and identify the data based on one or more LBAs. In turn, the DSD may map host-supplied LBAs and the corresponding data to physical sectors 504 of the DSD. The sectors 504 or physical storage locations may be referred to as physical block addresses (PBAs). When a host later requests the data based on the LBA, the physical sector storing the data can be looked up in an LBA mapping table and retrieved.

A given band 502 of a DSD may be designated for storing a specified range of LBAs. The range of LBAs may be referred to as a "logical band," while the actual collection of physical storage sectors may be referred to as a "physical band." In some embodiments, a logical band of LBAs may be re-assigned to a different physical band, and the corresponding data may be moved between physical bands accordingly. For example, a BRO operation may involve reading data from a first physical band of tracks designated for storing a logical band having LBAs 1-100, modifying the data, and rewriting the modified data to a different second physical band of tracks that is now designated to store the logical band of LBAs 1-100. The first physical band previously assigned to LBAs 1-100 may be formatted or otherwise erased, or simply designated as available for storage, and may then be assigned a different LBA range. Other embodiments are also possible.

Each sector 504 may include a data portion or data field 506, for example to store user data or a data "payload" of the sector 504. In addition, each sector 504 may include an error detection code (EDC) portion or field 508. The EDC field 508 may include code such as a cyclic redundancy check (CRC) checksum value, an input output error detection code (IOEDC) checksum value, or some other value. The EDC portion 508 may be read by a data storage device and used to determine errors when reading from the sector 504.

A function for generating the EDC value may be "seeded" based on the inputs. In some embodiments, the value stored to the EDC field 508 may be based on an LBA of the sector 504 and the data in the data field 506 of the sector. For example, in some embodiments the EDC may be an IOEDC, which is generated using a CRC function as follows:

IOEDC=$f_{CRC}$(data for the sector, LBA for the sector)

The function may involve hashing together the data field 506 value and the LBA value, performing one or more other computations, or any combination thereof. For example, the data for the sector may be run through a first algorithm to generate a first set of EDC bits, and the LBA may be run through a hash operation to generate a second set of EDC bits. The first set of EDC bits and the second set of EDC bits may be combined, e.g. through an XOR function, to produce an IOEDC value which may be stored to the sector. In some embodiments, the data and the LBA may each be run through hashing algorithm to reduce the size of the final EDC value. For example, a 512 byte data field and a 40-bit LBA may each output a 16-bit value after being put through hashing algorithms, and the two 16-bit values may be XORed to produce a 16-bit final EDC value. In some embodiments, only a portion of the LBA or data field may be used; e.g., the first 16 bits of the LBA may be input to the EDC function instead of the entire LBA. Other embodiments are also possible.

During host-initiated write commands, an EDC (e.g. an IOEDC) may be automatically calculated using a hardware block for pre-processing host-data, such as EDC module 110 of FIG. 1 or EDC module 230 of FIG. 2. The IOEDC may be appended to the end of the sector 504. When the sector 504 is read, a comparison IOEDC may be generated using the read data and the sector LBA, and compared against the IOEDC read from the EDC portion 508. If the two values match, it may indicate that the read operation did not encounter any errors. If the two values do not match, it may indicate an error in the stored data or in the reading process. The DSD may be configured to automatically correct a number of errors, attempt the read operation again, or other options.

However, the value of the EDC may be manipulated by changing the seeding mechanism, or altering the inputs to the EDC function. When marking a band as unwritten, for example during a FORMAT command, TRIM command, SANITIZE command or similar command, the EDC for each sector may be calculated using an alternate seeding mechanism. For example, a FORMAT command may include preparing a storage medium or area of storage medium for storing files, which may include reconfiguring storage locations or overwriting sectors. A TRIM command may include marking an area of memory as free for use, and may include re-writing the EDC portion of the sectors, the data portion of the sectors, or both. A SANITIZE command may include overwriting sectors one or more times to prevent recovery of data that had been stored to those commands.

An alternate seeding mechanism for EDCs may include modifying at least one of the inputs to the function. For example, rather than inputting the data for the sector and the LBA of the sector, an alternate seeding mechanism may include inputting the data for the sector and a pre-selected value in place of the LBA. In some embodiments, a modified version of the correct current LBA mapped to a PBA may be used to generate the EDC. In some embodiments, a different LBA, such as an LBA previously mapped to the PBA, may be stored to the EDC field. Other embodiments are also possible. By employing an alternate seeding mechanism for the EDC, a data storage device may be able to determine whether a sector contains valid data or invalid data.

Figure 6:
FIG. 6 is a table for a system employing a seeding mechanism for error detection codes, in accordance with certain embodiments of the present disclosure.

FIG. 6 is a table for a system employing a seeding mechanism for error detection codes, generally designated 600, in accordance with certain embodiments of the present disclosure. According to some embodiments, instead of using the LBA for a sector when generating an EDC for unwritten or invalid sectors, the DSD may use the one's complement of the LBA value. The one's complement of a binary number may be the value when all of the bits of the binary number are inverted.

The left column of table 600 depicts a number of example LBA values for sectors, simplified to eight bits each, and the corresponding decimal value. It may be understood that actual LBA values may be significantly larger. The right column of table 600 depicts the one's complement of the values in the left column, and the corresponding decimal value. As can be seen, each bit is flipped from 0 to 1 or from 1 to 0 when deriving the one's complement from the original LBA. Using a value such as the one's complement of the LBA may be desirable because the one's complement is the largest Euclidean distance (e.g. the maximum number of bit-flips) from the original LBA. Having every bit of the LBA flipped may provide high reliability when differentiating valid sectors containing host data from invalid sectors employing the alternate seeding mechanism. When a sector is later written with valid data, e.g. based on a host write command, the EDC may be calculated based on the data of the sector and the LBA. Accordingly, the DSD may be able to determine whether a sector contains valid data based on analyzing the EDC field.

For example, during a read operation the DSD may read the data field and the EDC field of a sector, and calculate a comparison EDC based on the read data and the LBA of the sector. If the comparison EDC matches the recorded EDC (for example, accounting for some threshold or allowable number of read errors), the DSD may determine that the sector contains valid data. If the comparison EDC does not match the recorded EDC, the DSD may re-calculate the comparison EDC using the read data and the one's complement of the LBA. If the one's complement-based EDC matches the recorded EDC, the DSD may determine that the sector does not contain valid data. In some embodiments, operations to attempt to re-read or correct data from the sector may not need to be performed, and the read data may not be returned.

Other modifications may also be made to the error detection code seeding mechanism. For example, rather than using the one's complement of the LBA, some other specific value may be used. For example, a specific LBA, such as 0x80000 (expressed in hexadecimal), may be used, or any other value that is unlikely to create difficulty in determining valid sectors from intentionally marked invalid sectors. In some embodiments, the LBA may be run through an alternate hashing function than used to generate a standard EDC. In some embodiments, the value of the data field input into the EDC equation may be modified instead of or in addition to modifying the LBA input. In some embodiments, the final recorded EDC value may be replaced with another value (e.g. all 1's or all 0's), rather than based on a function using sector-specific seed inputs. Other embodiments are also possible.

In some embodiments, an LBA previously mapped to the PBA may be used instead of the currently-mapped LBA. For example, if a logical band of LBAs is remapped to an available physical band, the physical band may still be recorded with old data and EDC values computed based on the previously-mapped LBA values. A data storage device (DSD) may keep track of the previously-mapped LBA range for each band. Accordingly, if a read operation is performed and the current LBA does not produce a matching EDC, the DSD may calculate an EDC based on the previously-mapped LBA. If the modified EDC matches the recorded EDC, the DSD may determine that the sector does not contain valid data. A previous LBA, especially when run through a hashing algorithm as part of the EDC generating function, is likely to contain a significant number of bits different from the currently mapped LBA.

Figure 7:
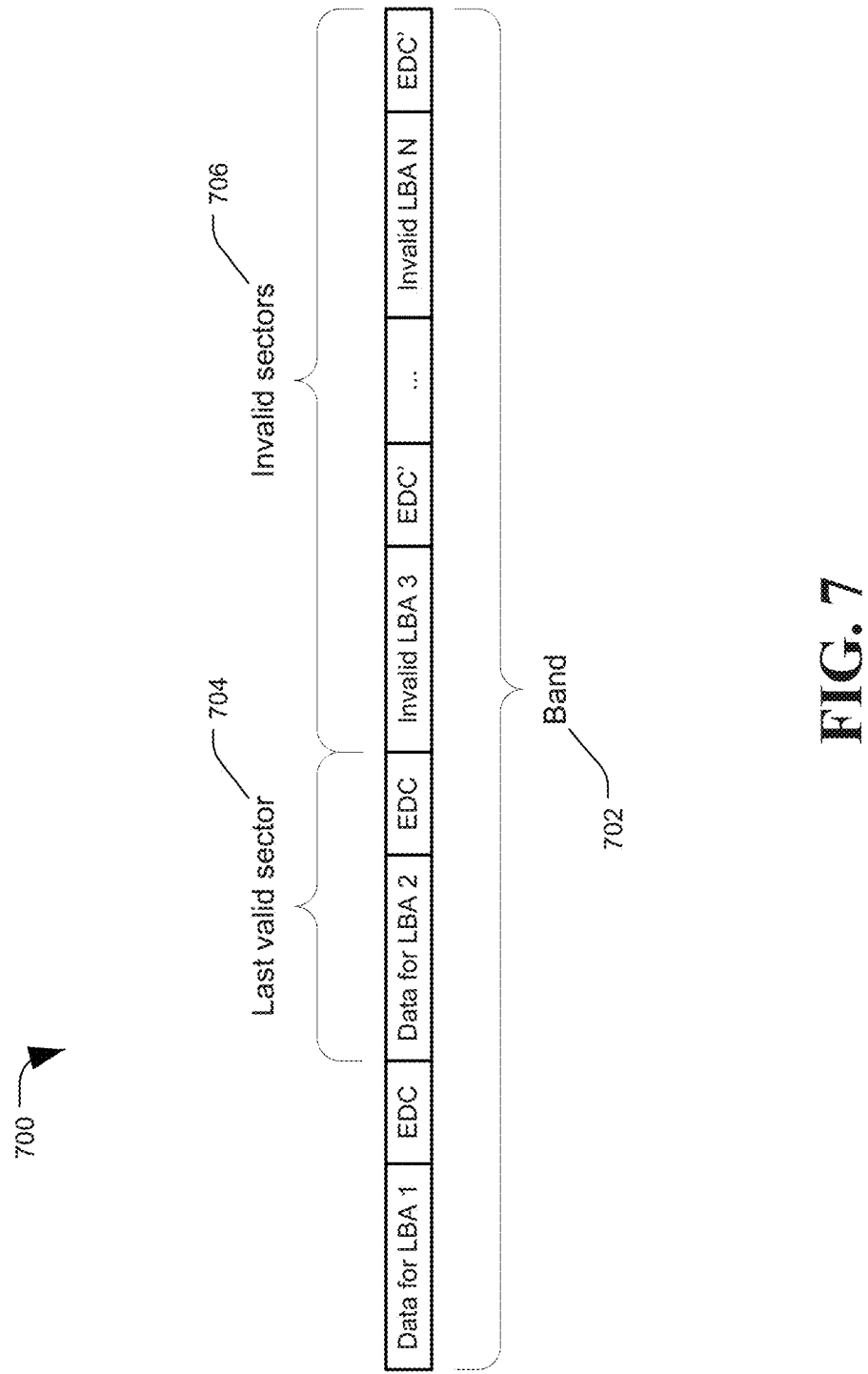
FIG. 7 is a diagram of a system employing a seeding mechanism for error detection codes, in accordance with certain embodiments of the present disclosure.

FIG. 7 is a diagram of a system employing a seeding mechanism for error detection codes, generally designated 700, in accordance with certain embodiments of the present disclosure. System 700 may include a band 702 that has been recorded sequentially from a first sector, for example using a shingled recording scheme. In some embodiments, the first two sectors corresponding to LBAs 1 and 2 may be written with valid data, and the EDC for those sectors may be calculated with an EDC formula for valid data; for example, EDC=$f_{CRC}$(data for sector, LBA). Because the data is written sequentially from the first sector, LBA 2 may be the last valid sector 704. Accordingly, LBA 3 through LBA N may be invalid sectors 706. The EDC for the invalid sectors 706 may be calculated with an alternate EDC seeding mechanism; for example, EDC'=$f_{CRC}$(data for sector, LBA').

Initially the entire band 702 may have been formatted with EDC' values to indicate the band had no valid data. In some embodiments, the EDC fields of the invalid sectors may be written at the same time as the valid sectors; e.g. first the valid sectors would be written at the beginning of the band with standard EDC values, and the remaining sectors may be recorded with EDC' values. By recording the invalid sectors with EDC' values at the same time the valid sectors are written (e.g. during a BRO), the "invalid" sectors may all be readable instead of having a track of unreadable sectors due to shingled overlap. The inputs for the EDC calculation for invalid sectors may have been the one's complement of the LBA (or some other specified alternate input) and a default bit pattern for the data portion, or in some embodiments residual data that was not cleared from the last time data was recorded to the sector, or some other value. When write commands are received and directed to band 702, the sectors may be overwritten with valid data, and the EDC may be seeded and re-recording based on the valid data field value and the actual LBA value.

This alternate seeding system can prevent reading of invalid sectors. Assume the DSD attempts to perform a read operation on LBA 3 or the third sector of band 702, for example based on a firmware bug or other error. The DSD may read the data, and calculate an EDC based on $f_{CRC}$(data field, LBA 3). The DSD may then compare the calculated EDC against the EDC' recorded to the band 702. Because the checksums do not match, the DSD may recalculate the comparison EDC based on the data field and some specified alternate input, such as the one's complement of LBA 3; e.g. comparison EDC'=$f_{CRC}$(data field, LBA 3'). If the comparison EDC' matches the EDC' recorded to the sector of LBA 3, the DSD may determine that LBA 3 does not contain valid data. A default bit pattern may be generated and returned in response to the read command, an error may be reported, or other actions may be taken.

The alternate seeding system can also be used to determine validly written sectors, for example to rebuild mapping information after an unexpected power loss. For example, the DSD may sequentially read sectors from a storage medium, and calculate comparison EDC values based on the read data and the LBA mapped to the sector. When the comparison EDC does not match the EDC recorded for the sector, the DSD may calculate an EDC' based on the alternate seeding mechanism, and compare the comparison EDC' to the recorded EDC. If the comparison EDC' and the recorded EDC match, the DSD may mark the sector as not containing valid data. If data is written sequentially, for example to a shingled recording band, and the first sector indicating invalid data is sector N, the DSD may mark sector N−1 as the last valid sector, and may not need to read the remaining sectors. If the invalid sector EDC values are not recorded at the same time or after the valid sectors are written in a shingled band, one track's worth of sectors following the final valid sector may be unreadable, due to shingled overlap. In some embodiments, after failing to read a selected number of sectors following a validly written sector, the DSD may be configured to skip ahead to a sector one track's distance after the last valid sector. If a comparison EDC' value for sector N (+1 track) matches the recorded EDC value, indicating an invalid sector, the DSD may mark sector N as the last validly recorded sector. Other embodiments are also possible.

Figure 8:
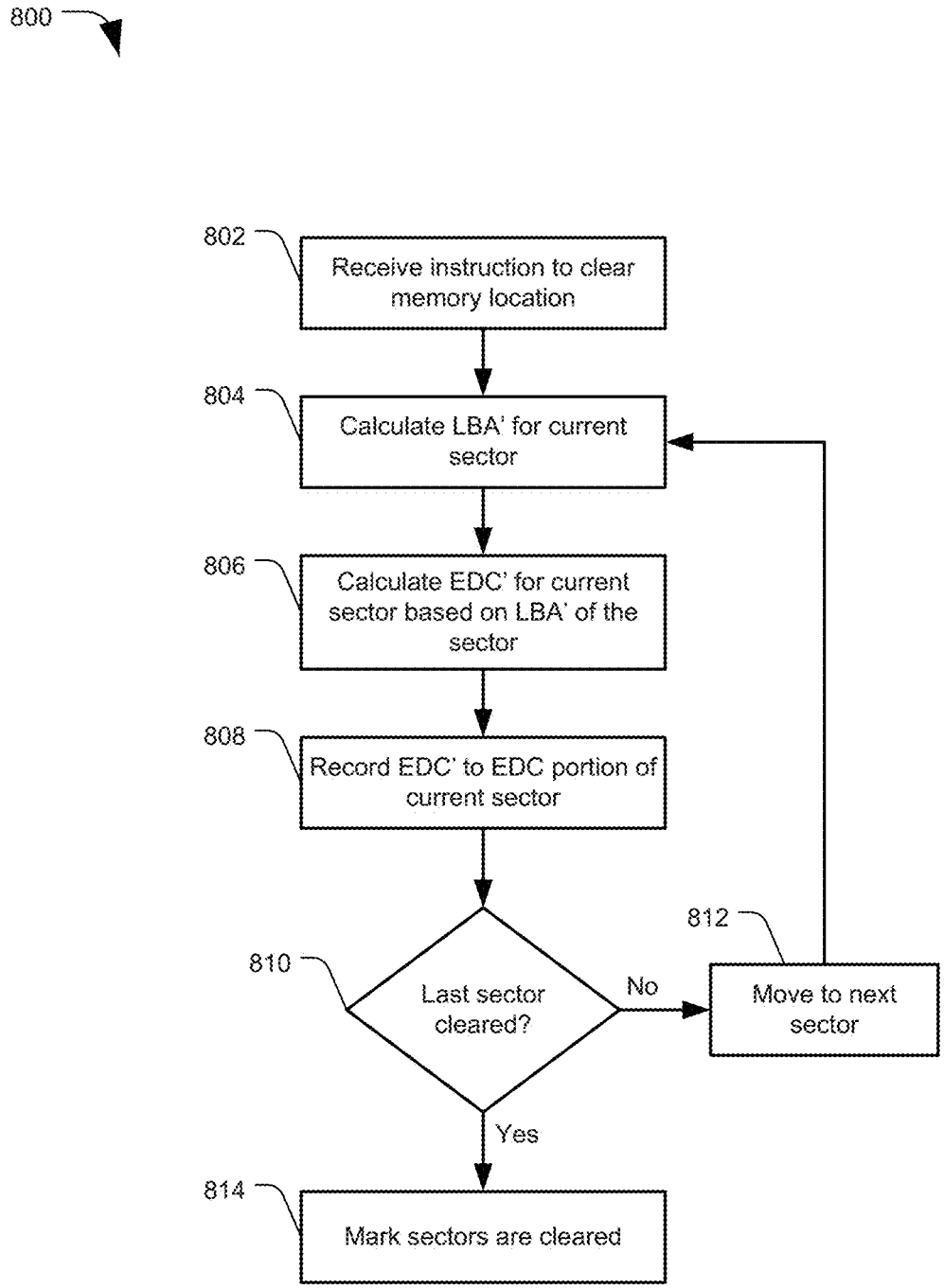
FIG. 8 is a flowchart of a method employing a seeding mechanism for error detection codes, in accordance with certain embodiments of the present disclosure.

FIG. 8 is a flowchart of an example method 800 for employing a seeding mechanism for error detection codes, in accordance with certain embodiments of the present disclosure. Method 800 may include receiving an instruction to clear a memory location, at 802. In some embodiments, this can include any command that may result in a storage device rewriting error detection code (EDC) portions of data storage areas containing invalid data. For example, commands to FORMAT, SANITIZE, TRIM, or a RESET WRITE POINTER small computer system interface (SCSI) command, or similar commands. The target memory location may be all or a portion of a storage medium, such as a plurality of sectors, a shingled storage band, any other memory location, or a combination thereof.

Method 800 may include selecting a sector and calculating an LBA' for the current sector, at 804. For example, if the target memory location is a shingled recording band, the method 800 may include starting with a first sector of the band, and proceeding sequentially through the sectors of the band, recording track-by-track in the shingle write direction. Calculating the LBA' may include generating a one's complement of an LBA corresponding to the current sector, another permutation of the LBA, or selecting a pre-specified LBA value to use for seeding the EDC function, and generating an EDC for the current sector which can identify the sector as not containing valid data. In some embodiments, a cleared physical band may have EDC values based on the currently-associated or previously-associated logical band, and when a new logical band is assigned, the LBA values used to generate the EDCs for the invalid sectors will not match the LBA values of the newly assigned logical band. This may allow the DSD to recognize the sectors as invalid. In some embodiments, different or additional data may be calculated for seeding the EDC function. For example, rather than modifying an LBA input, an input corresponding to a data field of the sector may be modified, or another input to the function may be modified in a way that allows the DSD to identify a sector as invalid based on the EDC. Other embodiments are also possible.

The method 800 may include calculating an EDC' for the current sector based on the LBA' of the sector, at 806. In some embodiments, the EDC' may be generated using a modified seed rather from those used to generate the EDC of a valid sector. For example, if an EDC function for a sector containing valid data is EDC=$f_{CRC}$(data for sector, LBA), the EDC' may be generated by modifying the seeding information, such as EDC'=$f_{CRC}$(data for sector, LBA'). In some embodiments, a modified seed other than LBA' may be used, for example based on a modified version of the data field seed, a modified or pre-selected version of another input, or some other selected seed. Other embodiments are also possible.

Method 800 may include recording the EDC' value to the EDC portion of the current sector, at 808. Optionally, the method 800 may also include recording a default data pattern to a data portion of the current sector, such as a bit sequence of all 1's or all 0's, or some other pattern.

At 810, the method may include determining if the last sector of the target memory location has been cleared or otherwise had its EDC portion re-recorded with an EDC' value. If not, the method 800 may include moving to the next sector of the target memory location, at 812, and calculating the LBA' for the next sector at 804. If the last sector has been cleared, at 810, the method may include marking the sectors as cleared or otherwise available for writing, at 814.

Figure 9:
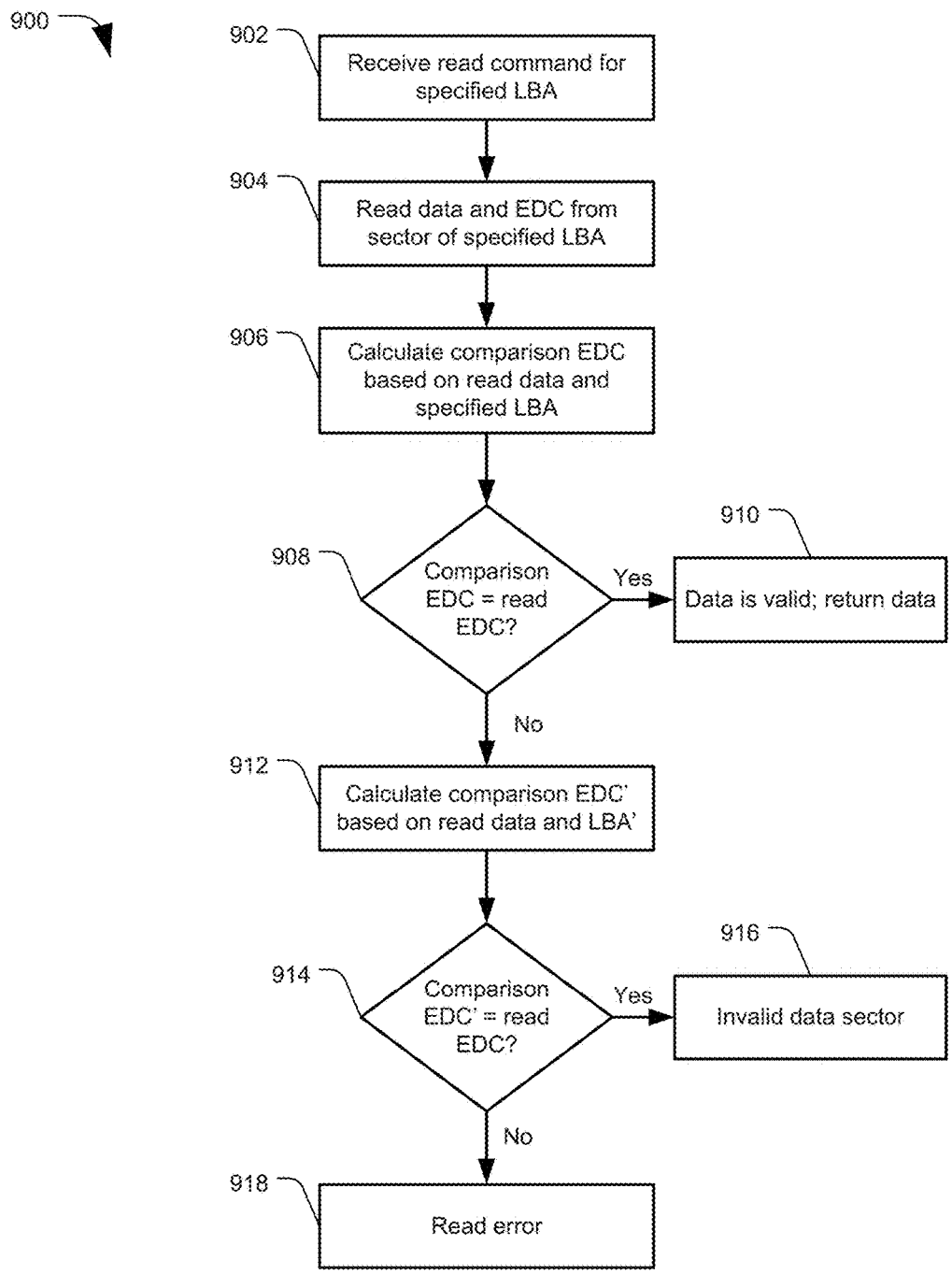
FIG. 9 is a flowchart of a method employing a seeding mechanism for error detection codes, in accordance with certain embodiments of the present disclosure.

FIG. 9 is a flowchart of an example method 900 for employing a seeding mechanism for error detection codes, in accordance with certain embodiments of the present disclosure. Method 900 may include receiving a read command for a specified LBA or specified storage sector, at 902. For example, the read command may originate from a host device, from an internal device process, or from another source.

Method 900 may include reading the data portion and the EDC portion from the sector based on the specified LBA, at 904. A comparison EDC may be calculated based on the read data and the specified LBA, at 906. In some embodiments, the comparison EDC may be generated using other seed data, depending on the EDC implementation.

The comparison EDC may be compared against the EDC stored to the sector, at 908. If the comparison EDC and the EDC read from the sector match, the data from the sector may be considered valid data, and the data may be returned in response to the read command, at 910.

If the comparison EDC does not match the read EDC, at 908, the method may include calculating a comparison EDC', based on the read data and an LBA' value, at 912. For example, the LBA' value may be a one's complement of the sector's LBA value, a pre-selected substitute LBA value, the sector's LBA value run through another equation such as a selected hash operation, the LBA previously assigned to the sector, or some other substitute LBA value. In some embodiments, the method 900 may include supplying different modified seed values to the EDC generating function to generate the EDC' value, such as a modified data field. Other embodiments are also possible.

Method 900 may include comparing the comparison EDC' value against the value read from the EDC portion of the sector, at 914. If the comparison EDC' value and the read EDC value match, the sector may be considered as including invalid data, at 916. For example, this may include not returning the read data field value in response to the read command. In some embodiments, a default bit value may be generated and returned in place of the read data field. If the read command originated from an internal firmware-initiated operation, a data storage device may identify an internal data-integrity algorithm bug in relation to the issued command, because the command was directed to a sector that does not contain valid data. In some embodiments, the firmware might decide to report media-error for such sector.

If the comparison EDC' value does not match the read EDC value, at 914, the method may include reporting a read error, at 918. For example, if neither the standard comparison EDC value nor the modified comparison EDC' value match the read EDC value, then the EDC value or data stored to the target sector may be corrupted, or otherwise erroneously recorded. Other embodiments are also possible.

Figure 10:
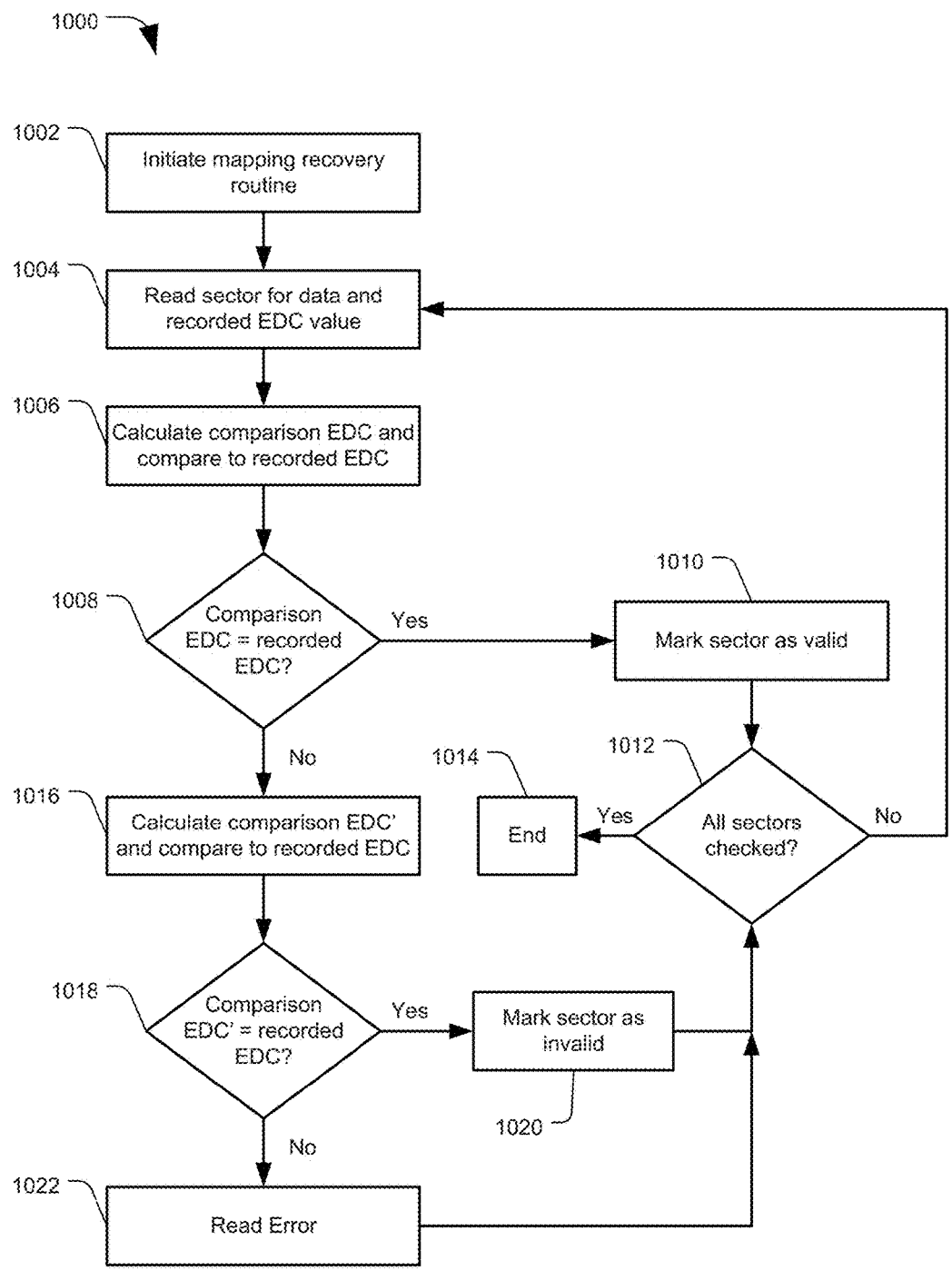
FIG. 10 is a flowchart of a method employing a seeding mechanism for error detection codes, in accordance with certain embodiments of the present disclosure.

FIG. 10 is a flowchart of an example method 1000 for employing a seeding mechanism for error detection codes, in accordance with certain embodiments of the present disclosure. Method 1000 may include initiating a mapping recovery routine, at 1002. For example, a data storage device (DSD) may experience an unexpected power loss prior to storing a most recent address map. In some embodiments, the DSD may know what logical band is assigned to a physical band, but may not have saved which sectors had been written with valid data. On power-on, the DSD may attempt to reconstruct some or all of the address map, or to determine which sectors contain valid data. The mapping recovery routine may include analyzing all sectors or memory areas, or a subset of memory areas. For example, the mapping recovery routine may be focused on one or more shingled recording bands, to determine validly written sectors, and which sectors within the band are not storing valid data.

Method 1000 may include selecting a first sector for analysis, and reading a data portion and an EDC portion of the sector, at 1004. The method 1000 may include calculating a comparison EDC value, and comparing it to the recorded EDC value, at 1006. For example, the comparison EDC value may be generated by seeding an EDC function with the data read from the sector and an LBA value for the sector.

If the comparison EDC value matches the recorded EDC value, at 1008, the method may include marking the sector as valid at 1010. For example, an address map may be updated to indicate that valid data is stored at the target sector for the corresponding LBA value. If all sectors have been checked for the mapping recovery routine, or for a current shingled band or other target memory location, at 1012, the method may end, at 1014. If all of the sectors have not been checked, at 1012, the method may move to the next sector and continue the mapping recovery routine, at 1004.

If the comparison EDC value does not match the recorded EDC value, at 1008, the method may include calculating a second comparison EDC value (e.g. a comparison EDC' value), and comparing it to the recorded EDC value, at 1016. For example, calculating the comparison EDC' value may include providing modified seeding values to an EDC generating function, such as the one's complement of the sector's LBA value, or an LBA previously assigned to the target sector.

If the comparison EDC' value matches the recorded EDC value, at 1018, the method may include marking the sector as invalid, at 1020. For example, an address map may be updated to indicate no valid data has been recorded to the current sector for the corresponding LBA value. In some embodiments, if data is recorded to the target memory area in a sequential manner, for example based on certain shingled recording schemes, the mapping recovery routine may be able to mark all sectors of the target memory area following the current sector as invalid. The mapping recovery routine may terminate if no other target memory areas remain for mapping recovery.

If the mapping recovery routine does not terminate at 1020, the method may include determining if all sectors for the target memory location have been checked, at 1012. If all sectors have been checked, the mapping recovery routine may end, at 1014. If all sectors have not been checked, the method may include selecting a next sector and reading the data from the next sector, at 1004.

If the comparison EDC' value does not match the recorded EDC value, at 1018, the method may include declaring a read error, at 1022. For example, this may indicate that power was lost while writing the target sector, and that the data field or the EDC field were corrupted or do not correlate. A DSD may perform a number of data recovery operations in order to re-read or correct the data. A read error may also result in the sector being marked as invalid. Other embodiments are also possible. The method 1000 may determine if all sectors have been checked, at 1012.

In some embodiments, such as for a shingled recording band that does not record EDC values for invalid sectors as part of a write operation, a read error may result from attempting to read a sector that has been shingled over by a preceding track. A DSD may be configured to determine a first invalid sector, based on compared EDC values, that follows a number of unreadable sectors. For example, after encountering a number of sectors resulting in read errors, the DSD may skip ahead a number of sectors based on the assumption that the read errors correspond to a track of sectors partially overwritten by a preceding track. The DSD may be able to determine that all sectors following the invalid sector and unreadable sectors are invalid.

Figure 11:
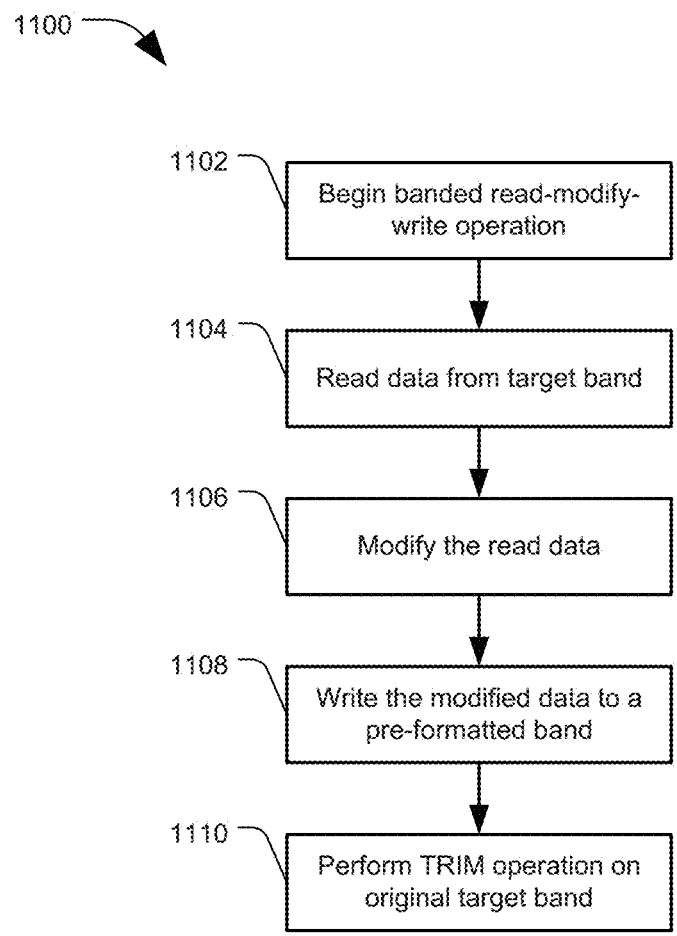
FIG. 11 is a flowchart of a method employing a seeding mechanism for error detection codes, in accordance with certain embodiments of the present disclosure.

FIG. 11 is a flowchart of an example method 1100 for employing a seeding mechanism for error detection codes, in accordance with certain embodiments of the present disclosure. Method 1100 may include beginning a banded read-modify-write operation (BRO), at 1102. For example, a shingled recording band may include valid and invalid recorded data, and a write operation may be received for the band. A banded read-modify-write operation may be invoked to update or record new data to the band, which operation may include reading data from a band, modifying the read data with the new data, and recording the modified data to the same band or to a different available band. In some embodiments, the read data may be recorded to a "scratch pad" memory location, and then recorded to a physical band. Recording to a scratch pad memory may prevent data loss based on the shingled writing if an unexpected power loss occurs.

Method 1100 may include reading data from the target band, at 1104. In some embodiments, all data may be read from the band. In some embodiments, invalid data, e.g. data marked as deleted, may not be copied for re-writing. In some embodiments, invalid data may be replaced with new write data, or a default data pattern when writing the band as part of the BRO. The method 1100 may include modifying the read data, such as by adding new data from a write command, or replacing data with updated data, at 1106.

Method 1100 may include writing the modified data to a pre-formatted band, at 1108. For example, the data may be read from a first band, at 1104, and rewritten to a second band, at 1108. The pre-formatted band may include a band having modified error detection code values (e.g. EDC') stored to the EDC portions of available data sectors of the band. The pre-formatted band may be remapped to store data having LBAs corresponding the modified data. Data storage device performance may be improved by storing the modified data to an available pre-formatted band, rather than recording EDC' values to the first band after reading the valid data and prior to re-writing the modified data.

The available pre-formatted band may have been TRIMed or otherwise cleared, wiped, or erased prior to receiving the new logical band. For example, the data fields of the sectors may have been cleared of valid data or written with default patterns, and the EDC fields may have been written with EDC' values to indicate the sectors contain invalid data. In some embodiments, the pre-formatted band may contain old invalid data, and corresponding EDC values based on a previously-mapped LBA range for the band. The DSD may retain a record of a previous LBA range assigned to the band, and may calculate comparison EDC' values based on the previous assigned LBA. For example, a DSD may maintain a band mapping table, including a current logical band or LBA range field, and an previous logical band or LBA range field, and an "available" flag for each physical band. A physical band flagged as "available" may have the current LBA range value transferred to the previous LBA range field, and the current LBA range field may be populated with the new logical band to be recorded to the physical band. Other embodiments are also possible.

In some embodiments, method 1100 may optionally include performing a TRIM operation on the original target band, or another operation that may include rewriting the EDC values for the now-available sectors. For example, the TRIM operation may be performed immediately after completing the BRO, prior to beginning a subsequent BRO that would store data to the original target band, when the DSD is in an idle period (e.g. a threshold time of inactivity or without receiving a host command), or at another time.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
a processor configured to:
calculate and record EDC values for memory locations containing valid data based on a first set of seed values to an EDC function; and
calculate and record alternate EDC values for memory locations containing invalid data based on a second set of seed values to the EDC function;
the first set of seed values includes a first logical block address (LBA) value associated with the respective memory location containing valid data;
the second set of seed values includes a different LBA value than a second LBA value associated with the respective memory location containing invalid data;
calculate a modified EDC based on the second set of seed values;
compare a first error detection code (EDC) stored to a target memory location to the modified EDC to determine whether the target memory location contains valid data; and
return an indication that the target memory location does not contain valid data when the first EDC matches the modified EDC.

2. The apparatus of claim 1 comprising the processor further configured to:
sequentially read data sectors from a band of tracks recorded in a shingled manner; and
designate a second memory location preceding the target memory location as a last valid memory location in the band when the first EDC of the target memory location matches the modified EDC.

3. The apparatus of claim 1 comprising the processor further configured to:
receive a read command from a host device directed to the target memory location;
generate a default bit pattern to return to the host when the first EDC matches the modified EDC; and
return the default bit pattern to the host.

4. The apparatus of claim 1 further comprising:
the different LBA value includes a one's complement of the second LBA value.

5. The apparatus of claim 1 further comprising:
the different LBA value includes a specific LBA value designated for use in the second set of seed values.

6. The apparatus of claim 1 comprising the processor further configured to:
compare the first EDC to a comparison EDC calculated using the first set of seed values;
determine that the target memory location contains valid data when the first EDC matches the comparison EDC;
compare the first EDC to the modified EDC when the first EDC does not match the comparison EDC; and
determine a read error when the first EDC does not match the modified EDC.

7. The apparatus of claim 1 comprising the processor further configured to:
receive a read command directed to the target memory location in a first physical band of tracks recorded in a shingled manner;
calculate a comparison EDC based on a first logical block address (LBA) currently associated with the target memory location;
compare the first EDC with the comparison EDC;
determine that the target memory location contains valid data when the first EDC matches the comparison EDC; and
calculate the modified EDC based on a second LBA previously associated with the target memory location.

8. The apparatus of claim 7 comprising the processor further configured to:
receive a write command directed to a range of LBAs associated with a second physical band of tracks recorded in a shingled manner;
read valid data from the second physical band and modify the valid data to include data associated with the write command to create modified data;
write the modified data to the first physical band of tracks, the first physical band having invalid data and recorded EDC values generated based on LBAs associated with the invalid data; and
associate the range of LBAs with the first physical band.

9. A method comprising:
calculating and recording EDC values for memory locations containing valid data based on a first set of seed values to an EDC function;
calculating and recording alternate EDC values for memory locations containing invalid data based on a second set of seed values to the EDC function;
receiving a request to read a target memory location of a data storage device;
calculating a modified EDC based on the second set of seed values;
comparing a first error detection code (EDC) stored to the target memory location to the modified EDC to determine whether the target memory location contains valid data; and
returning an indication that the target memory location does not contain valid data when the first EDC matches the modified EDC.

10. The method of claim 9 further comprising:
sequentially reading data sectors from a band of tracks recorded in a shingled manner; and
designating a second memory location preceding the target memory location as a last valid memory location in the band when the first EDC of the target memory location matches the modified EDC.

11. The method of claim 9 further comprising:
the first set of seed values includes a first logical block address (LBA) value associated with the memory location containing the valid data; and
the second set of seed values includes a different LBA value than a second LBA value associated with the memory location containing the invalid data.

12. The method of claim 11 further comprising:
comparing the first EDC to a comparison EDC calculated using the first set of seed values;
determining that the target memory location contains valid data when the first EDC matches the comparison EDC;
comparing the first EDC to the modified EDC when the first EDC does not match the comparison EDC; and
determining a read error when the first EDC does not match the modified EDC.

13. The method of claim 9 further comprising:
receiving the request directed to the target memory location in a first physical band of tracks recorded in a shingled manner;

calculating a comparison EDC based on a first logical block address (LBA) currently associated with the target memory location;
comparing the first EDC with the comparison EDC;
determining that the target memory location contains valid data when the first EDC matches the comparison EDC; and
calculating the modified EDC based on a second LBA previously associated with the target memory location.

14. The method of claim 13 further comprising:
receiving a write command directed to a range of LBAs associated with a second physical band of tracks recorded in a shingled manner;
reading valid data from the second physical band of tracks and modify the valid data to include data associated with the write command to create modified data;
writing the modified data to the first physical band of tracks, the first physical band of tracks having invalid data and recorded EDC values generated based on LBAs associated with the invalid data; and
associating the range of LBAs with the first physical band.

15. A memory device that stores instructions that, when executed, cause a processor to perform a method comprising:
calculating and recording EDC values for memory locations containing valid data based on a first set of seed values to an EDC function, the first set of seed values including a first logical block address (LBA) value associated with the respective memory location containing valid data; and
calculating and recording alternate EDC values for memory locations containing invalid data based on a second set of seed values to the EDC function, the second set of seed values including includes a different LBA value than a second LBA value associated with the respective memory location containing invalid data;
receiving a request to read a target memory location of a data storage device;
calculating a modified EDC based on the second set of seed values;
comparing a first error detection code (EDC) stored to the target memory location to the modified EDC to determine whether the target memory location contains valid data; and
determining the target memory location does not contain valid data when the first EDC matches the modified EDC.

16. The memory device of claim 15, the method further comprising:
calculating a comparison EDC based on a first logical block address (LBA) currently associated with the target memory location;
comparing the first EDC with the comparison EDC;
determining that the target memory location contains valid data when the first EDC matches the comparison EDC; and
calculating the modified EDC based on a second LBA previously associated with the target memory location.

17. The memory device of claim 15 further comprising:
the different LBA value includes a one's complement of the second LBA value.

18. The memory device of claim 15 further comprising:
the different LBA value includes a specific LBA value designated for use in the second set of seed values.

19. The memory device of claim 15 comprising the method further configured to:
comparing the first EDC to a comparison EDC calculated using the first set of seed values;
determining that the target memory location contains valid data when the first EDC matches the comparison EDC;
comparing the first EDC to the modified EDC when the first EDC does not match the comparison EDC; and
determining a read error when the first EDC does not match the modified EDC.

* * * * *